United States Patent
Dunne et al.

(10) Patent No.: US 10,362,071 B2
(45) Date of Patent: Jul. 23, 2019

(54) SYSTEM AND METHOD FOR MANAGING SERVICE LEVEL OF REAL-TIME COMMUNICATION

(71) Applicant: International Business Machines Corporation, Armonk, NY (US)

(72) Inventors: Jonathan Dunne, Waterford (IE); Liam Harpur, Skerries (IE); Shao Hua, Beijing (CN); Wang Yong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/341,476

(22) Filed: Nov. 2, 2016

(65) Prior Publication Data

US 2018/0124135 A1   May 3, 2018

(51) Int. Cl.
H04L 29/06 (2006.01)

(52) U.S. Cl.
CPC ...... *H04L 65/4015* (2013.01); *H04L 65/1089* (2013.01); *H04L 65/403* (2013.01)

(58) Field of Classification Search
CPC ............ H04L 65/4015; H04L 65/1069; H04L 65/1089; H04L 65/403
See application file for complete search history.

(56) References Cited

U.S. PATENT DOCUMENTS

| 8,438,225 | B2 | 5/2013 | Serr et al. |
| 8,560,612 | B2 | 10/2013 | Kilmer et al. |
| 8,737,273 | B1 | 5/2014 | Jones et al. |
| 2010/0199320 | A1 | 8/2010 | Ramanathan et al. |
| 2013/0144950 | A1* | 6/2013 | Sanakaranarasimhan ............ G06Q 10/10 709/204 |
| 2013/0238729 | A1 | 9/2013 | Holzman et al. |
| 2016/0036875 | A1* | 2/2016 | High ................ H04L 65/4038 709/204 |
| 2018/0203580 | A1* | 7/2018 | Rosenberg ............ G06F 3/0487 |

FOREIGN PATENT DOCUMENTS

WO     2013085570 A2     6/2013

* cited by examiner

Primary Examiner — Brian J. Gillis
Assistant Examiner — Chhian (Amy) Ling
(74) Attorney, Agent, or Firm — Brian J. Colandreo, Esq.; Jeffrey T. Placker, Esq.; Holland & Knight LLP

(57) ABSTRACT

A method, computer program product, and computer system for launching a collaboration session between a plurality of participants. Use data associated with the collaboration session may be identified. One or more collaboration services may be pre-provisioned with the collaboration session based upon, at least in part, the use data.

18 Claims, 7 Drawing Sheets

| Team Name | Collaboration Duration (Mins) | Group Chat Time | eMeeting Time | Screen Share Time | White Board time | Audio Time | Video Time |
|---|---|---|---|---|---|---|---|
| Team A | 345 | 50 | 25 | 50 | 75 | 0 | 145 |
| Team B | 126 | 0 | 0 | 0 | 0 | 75 | 51 |
| Team C | 34 | 12 | 12 | 5 | 5 | 0 | 0 |

| Team Name | Collaboration Duration (Mins) | Group Chat Time | eMeeting Time | Screen Share Time | White Board time | Audio Time | Video Time |
|---|---|---|---|---|---|---|---|
| Team A | 345 | 50 | 50 | 50 | 75 | 0 | 145 |
| Team B | 126 | 0 | 0 | 0 | 0 | 75 | 51 |
| Team C | 34 | 12 | 12 | 5 | 5 | 0 | 0 |

SYSTEM AND METHOD FOR MANAGING SERVICE LEVEL OF REAL-TIME COMMUNICATION

BACKGROUND

With the fast development of remote collaboration, real-time communication tools/collaboration services (e.g., Instant Messaging (IM) chats, e-meetings, whiteboard, screen share, etc.) may be used in daily professional life and personal life. Generally, it may be possible to have users of the real-time collaboration session manually provision each collaboration service on an as-needed basis; however, this may take time and may disrupt the fluid nature of the collaboration session. Alternatively, it may be faster to have real-time communication sessions enable the pre-provisioning of each collaboration service, just in case any one of them is needed. This may be an expensive process (e.g., from the perspective of server side resources), and all of the provisioned collaboration services may not even be used.

BRIEF SUMMARY OF DISCLOSURE

In one example implementation, a method, performed by one or more computing devices, may include but is not limited to launching, by a computing device, a collaboration session between a plurality of participants. Use data associated with the collaboration session may be identified. One or more collaboration services may be pre-provisioned with the collaboration session based upon, at least in part, the use data.

One or more of the following example features may be included. It may be determined that an additional collaboration service is needed during the collaboration session and the use data associated with the collaboration session may be updated. The use data may include duration of use for one or more of at least one of the one or more collaboration services and an additional collaboration service provisioned during the collaboration session. The use data may include one or more of the plurality of participants in the collaboration session. The use data may include one or more groups associated with the plurality of participants in the collaboration session. The use data may include coefficient data associated with the collaboration session. The coefficient data may be derived using multi-factor regression analysis.

In another example implementation, a computing system may include one or more processors and one or more memories configured to perform operations that may include but are not limited to launching a collaboration session between a plurality of participants. Use data associated with the collaboration session may be identified. One or more collaboration services may be pre-provisioned with the collaboration session based upon, at least in part, the use data.

One or more of the following example features may be included. It may be determined that an additional collaboration service is needed during the collaboration session and the use data associated with the collaboration session may be updated. The use data may include duration of use for one or more of at least one of the one or more collaboration services and an additional collaboration service provisioned during the collaboration session. The use data may include one or more of the plurality of participants in the collaboration session. The use data may include one or more groups associated with the plurality of participants in the collaboration session. The use data may include coefficient data associated with the collaboration session. The coefficient data may be derived using multi-factor regression analysis.

In another example implementation, a computer program product may reside on a computer readable storage medium having a plurality of instructions stored thereon which, when executed across one or more processors, may cause at least a portion of the one or more processors to perform operations that may include but are not limited to launching a collaboration session between a plurality of participants. Use data associated with the collaboration session may be identified. One or more collaboration services may be pre-provisioned with the collaboration session based upon, at least in part, the use data.

One or more of the following example features may be included. It may be determined that an additional collaboration service is needed during the collaboration session and the use data associated with the collaboration session may be updated. The use data may include duration of use for one or more of at least one of the one or more collaboration services and an additional collaboration service provisioned during the collaboration session. The use data may include one or more of the plurality of participants in the collaboration session. The use data may include one or more groups associated with the plurality of participants in the collaboration session. The use data may include coefficient data associated with the collaboration session. The coefficient data may be derived using multi-factor regression analysis.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 6 is an example diagrammatic view of use data table according to one or more example implementations of the disclosure; and FIG. 7 is an example diagrammatic view of use data table according to one or more example implementations of the disclosure.

Like reference symbols in the various drawings indicate like elements.

DETAILED DESCRIPTION

Figure 1:
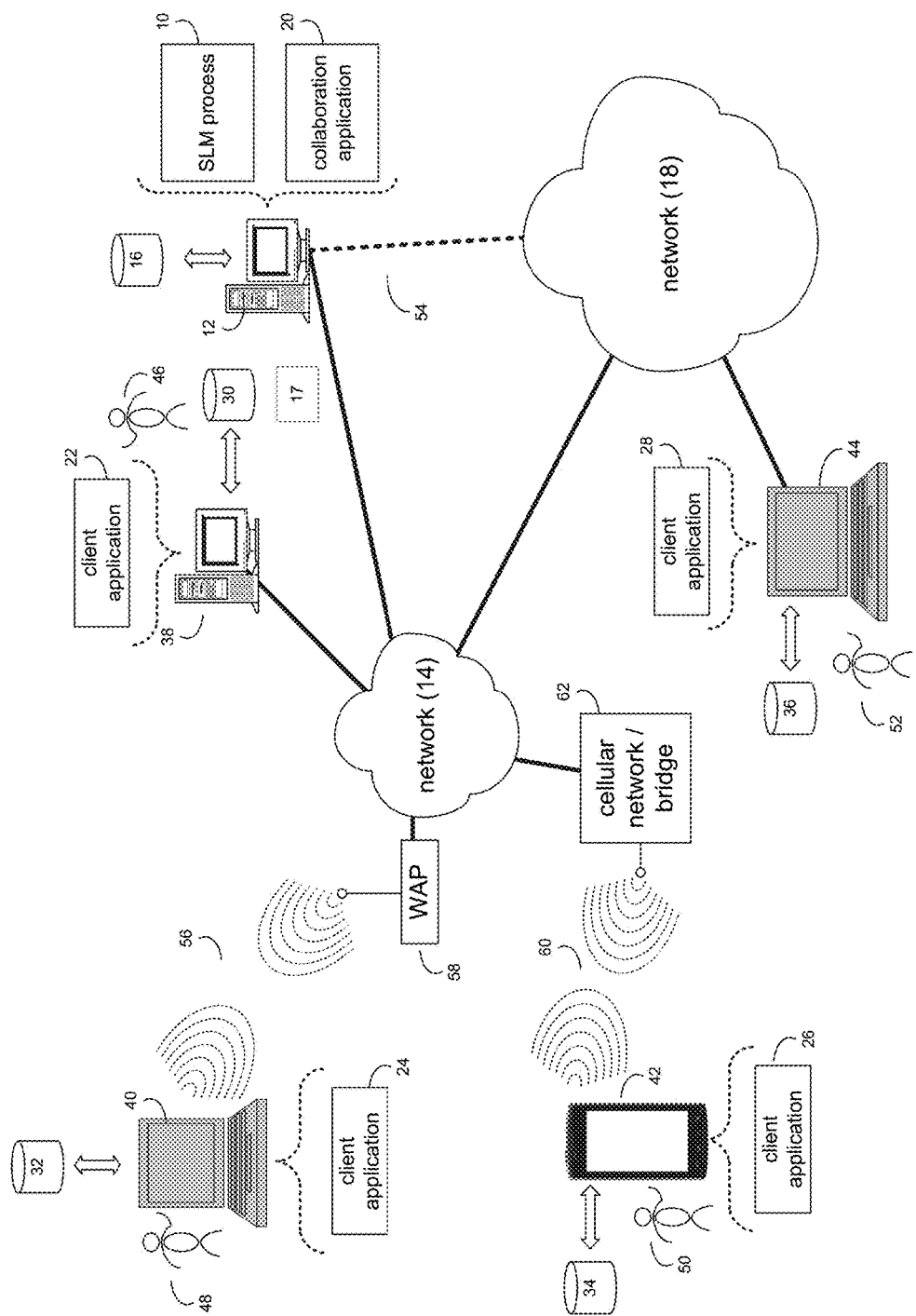
FIG. 1 is an example diagrammatic view of a Service Level Management (SLM) process coupled to an example distributed computing network according to one or more example implementations of the disclosure.

System Overview:

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown Service Level Management (SLM) process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), a mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a SLM process, such as SLM process 10 of FIG. 1, may launch a collaboration session between a plurality of participants. Use data (such as use data 17) associated with the collaboration session may be identified. One or more collaboration services may be pre-provisioned with the collaboration session based upon, at least in part, the use data.

In some implementations, the instruction sets and subroutines of SLM process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, SLM process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a collaboration application (e.g., collaboration application 20), examples of which may include, but are not limited to, e.g., an e-Meeting application (such as a web conferencing application, a video conferencing application, a voice-over-IP application, a video-over-IP application), an Instant Messaging (IM)/"chat" application, a screen share application, a white board application, a short messaging service (SMS)/multimedia messaging service (MMS) application, or other application that allows for virtual meeting and/or remote collaboration. In some implementations, SLM process 10 and/or collaboration application 20 may be accessed via one or more of client applications 22, 24, 26, 28. In some implementations, SLM process 10 may be a standalone application, or may be an applet/application/script/extension that may interact with and/or be executed within collaboration application 20, a component of collaboration application 20, and/or one or more of client applications 22, 24, 26, 28. In some implementations, collaboration application 20 may be a standalone application, or may be an applet/application/script/extension that may interact with and/or be executed within SLM process 10, a component of SLM process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of SLM process 10 and/or collaboration application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a screen share application, a white board application, a short messaging service (SMS)/multimedia messaging service (MMS) application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of SLM process 10 (and vice versa). Accordingly, in some implementations, SLM process 10 may be a purely server-side application, a purely client-side application, or a hybrid server-side/client-side application that is cooperatively executed by one or more of client applications 22, 24, 26, 28 and/or SLM process 10.

In some implementations, one or more of client applications 22, 24, 26, 28 may be configured to effectuate some or all of the functionality of collaboration application 20 (and vice versa). Accordingly, in some implementations, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, SLM process 10, and collaboration application 20, taken singly or in any combination, may effectuate some or all of the same functionality, any description of effectuating such functionality via one or more of client applications 22, 24, 26, 28, SLM process 10, collaboration application 20, or combination thereof, and any described interaction(s) between one or more of client applications 22, 24, 26, 28, SLM process 10, collaboration application 20, or combination thereof to effectuate such functionality, should be taken as an example only and not to limit the scope of the disclosure.

In some implementations, one or more of users 46, 48, 50, 52 may access computer 12 and SLM process 10 (e.g., using one or more of client electronic devices 38, 40, 42, 44) directly through network 14 or through secondary network 18. Further, computer 12 may be connected to network 14 through secondary network 18, as illustrated with phantom link line 54. SLM process 10 may include one or more user interfaces, such as browsers and textual or graphical user interfaces, through which users 46, 48, 50, 52 may access SLM process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
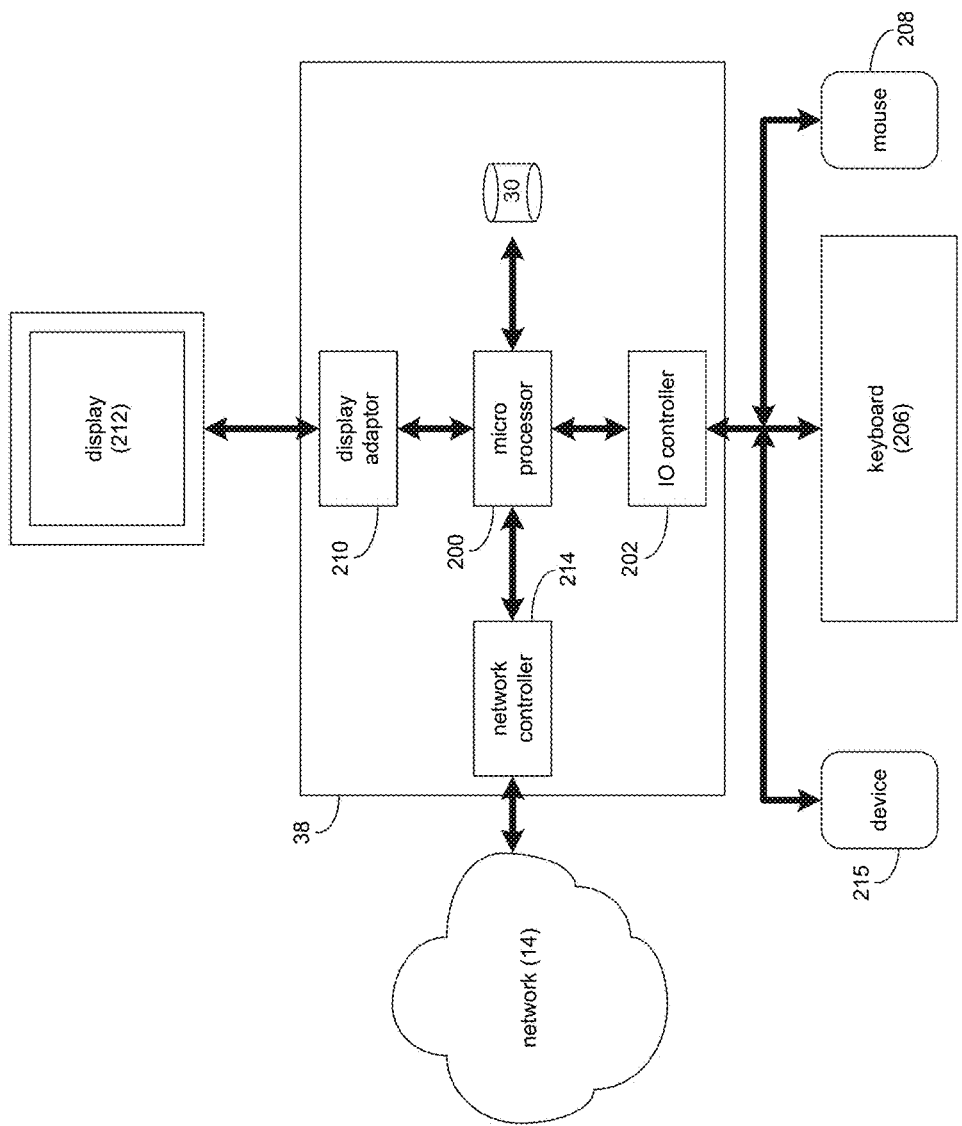
FIG. 2 is an example diagrammatic view of a client electronic device of FIG. 1 according to one or more example implementations of the disclosure.
Figure 3:
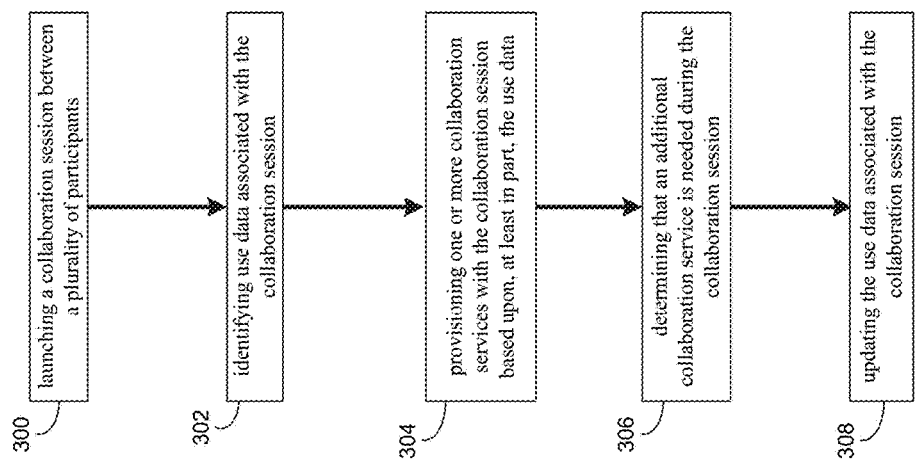
FIG. 3 is an example flowchart of a SLM process according to one or more example implementations of the disclosure.
Figure 4:
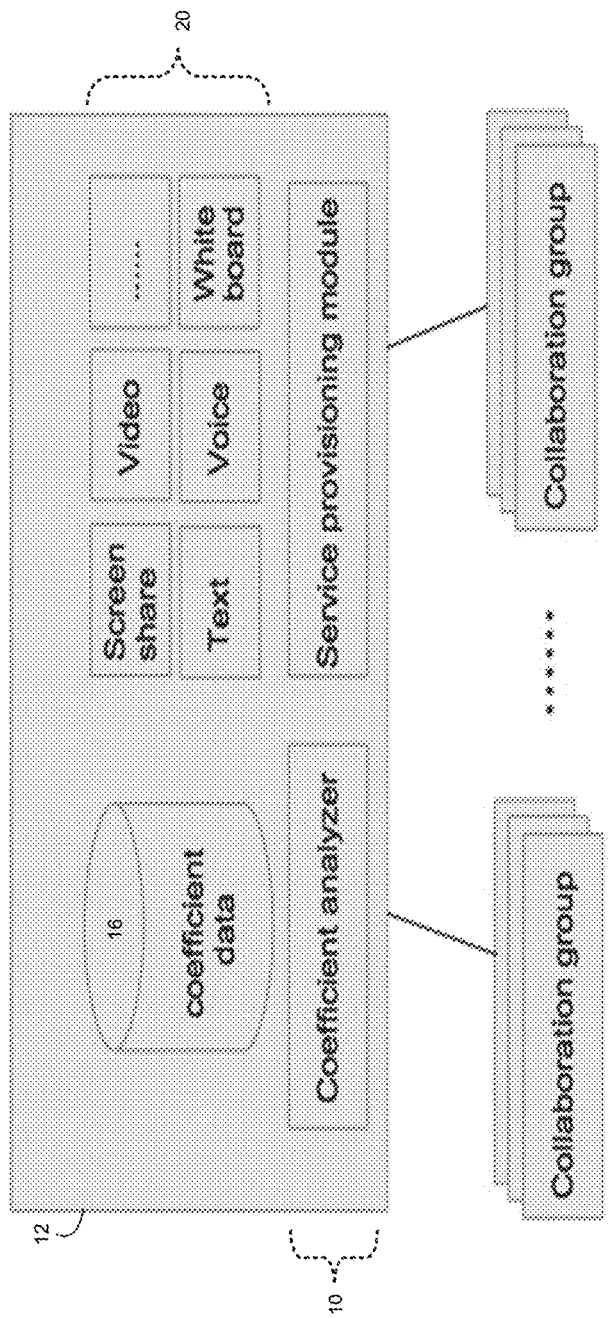
FIG. 4 is an example alternative diagrammatic view of an SLM process coupled to an example distributed computing network according to one or more example implementations of the disclosure.
Figure 5:
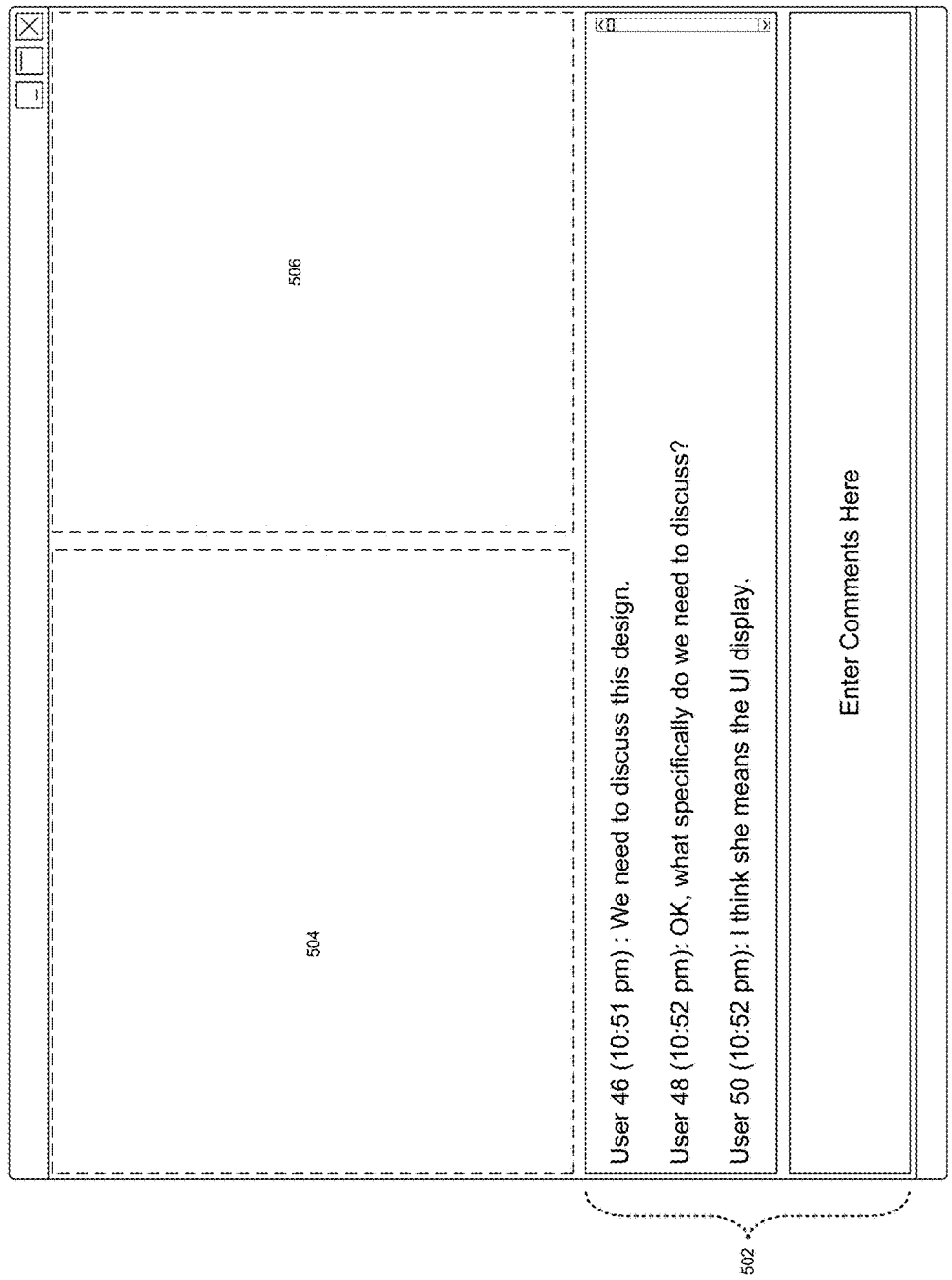
FIG. 5 is an example diagrammatic view of a screen image displayed by a SLM process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, SLM process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

The SLM Process:

As discussed above and referring also at least to the example implementations of FIGS. 3-7, Service Level Management (SLM) process 10 may launch 300 a collaboration session between a plurality of participants. SLM process 10 may identify 302 use data associated with the collaboration session. SLM process 10 may pre-provision 304 one or more collaboration services with the collaboration session based upon, at least in part, the use data.

With the fast development of remote collaboration technology, real-time communication tools/collaboration services (e.g., Instant Messaging (IM) chats, e-meetings with audio/video capabilities, whiteboard, screen share, etc.) may be used in daily professional life and personal life. Generally, it may be possible to have users of the real-time collaboration session manually provision each collaboration service on an as-needed basis during the collaboration session; however, this may take time and may disrupt the fluid nature of the collaboration session. Alternatively, it may be faster to have real-time communication sessions enable the pre-provisioning of all collaboration service, just in case any one of them is needed; however, this may be an expensive process (e.g., from the perspective of server side resources), and all of the provisioned collaboration services may not even be used. As will be discussed below, SLM process 10 may at least help improve existing technological processes associated with, e.g., provisioning collaboration services, e.g., with collaboration sessions.

In some implementations, SLM process 10 may launch 300 a collaboration session between a plurality of participants. For instance, and referring at least to the example implementation of FIG. 4, assume for example purposes only that a plurality of users (e.g., users 46, 48, 50, 52 or combination thereof) want to hold a collaboration session (e.g., via computer 12 and/or the respective client electronic devices of the users noted above) by using, e.g., an Instant Messaging (IM) chat. In the example, SLM process 10 may launch 300 the collaboration session using the original collaboration service (e.g., IM chat 502) launched between the plurality of participants (e.g., in a particular collaboration group or team), shown in the example user interface 500 associated with SLM 10 in example FIG. 5. In some implementations, user interface 500 may include specific sections for other collaboration services (e.g., such as sections 504 and 506) discussed further below. In some implementations, other collaboration services may be displayed to the user as an alternative window object and/or alternative user interface (not shown).

In some implementations, SLM process 10 may identify 302 use data (e.g., use data 17) associated with the collaboration session. For instance, in some implementations, the use data may include one or more of the plurality of participants in the collaboration session. For example, and continuing with the above example, if users 46, 48, 50, 52 are participants in the collaboration session, the identified 302 use data may include the identity of users 46, 48, 50, 52. Similarly, if users 46, 48, 52 are participants in the collaboration session, the identified 302 use data may include the identity of users 46, 48, 52. In some implementations, the identified 302 use data may include information about the users that are participating in the collaboration session, such as, e.g., job title (e.g., software designer, salesperson, etc.), position (e.g., manager, president, CEO, etc. across one or more business entities), or any other information about the users that are participating in the collaboration session. In some implementations, this information may be stored (e.g., via storage device 16) and accessible to SLM process 10.

It will be appreciated that other information about the users that are participating in the collaboration session may be identified 302 without departing from the scope of the disclosure. As such, the description of specific types of identified 302 use data should be taken example only and not to otherwise limit the scope of the disclosure. For instance, in some implementations, the use data may include one or more groups associated with the plurality of participants in the collaboration session. For example, the identified 302 use data may include information about the users that are participating in the collaboration session, such as, e.g., any groups/teams of users associated with the users that are participating in the collaboration session. For instance, and continuing with the above example, users 46, 48, 52 may be friends in a pre-determined or current "group chat" as participants in the collaboration session. As another example, users 46, 48, 52 may be part of one or more teams (e.g., software development team in a particular company or across one or more companies) in a pre-determined or current "group chat" as participants in the collaboration session. As used herein, the terms group and team may be used interchangeably.

In some implementations, the use data may include duration of use for one or more of at least one of the one or more collaboration services and an additional collaboration service provisioned during the collaboration session. For example, and referring at least to an example implementation of FIG. 6, an example table 600 is shown organizing identified 302 use data. In the example, the identified 302 use data may include, e.g., team name for the users participating in the collaboration session, duration of time each team has spent in one or more collaboration sessions (e.g., in minutes), each collaboration service used per team in one or more collaboration sessions, and the duration of time used for each collaboration service in one or more collaboration sessions. For instance, table 600 details use data that team A has conducted one or more collaboration sessions lasting (individually and/or combined from past collaboration sessions) 345 minutes, where during that time, 50 minutes was spent using the group chat (IM chat) collaboration service, 25 minutes was spent using the eMeeting collaboration service, 50 minutes was spent using the screen share collaboration service, 75 minutes was spent using the whiteboard collaboration service, 0 minutes was spent using the an audio collaboration service (or the audio portion of another collaboration service), and 145 minutes was spent using the video collaboration service (or the video portion of another collaboration service). While table 600 is described using three team names, it will be appreciated that more or less team names, any of the above-noted use data (e.g., individual users, job title, position, etc.), as well as any various formatting of the use data, may be used without departing from the scope of the disclosure.

In some implementations, SLM process 10 may pre-provision 304 one or more collaboration services with the collaboration session based upon, at least in part, the use data. For instance, assume for example purposes only that the identified 302 use data in table 600 is the cumulative amount of time for one or more past collaboration sessions. For example, assume that table 600 identifies 302 use data combining two past collaboration sessions (at least for team A). Further assume for example purposes only that based upon a threshold duration of time spent using a particular collaboration service with the past, e.g., two collaboration sessions for team A, SLM process 10 may pre-provision 304 one or more collaboration services upon launching 300 the collaboration service for team A. For instance, assume that the threshold duration of time is, e.g., 50 minutes and further assume that SLM process 10 is launching 300 the collaboration service for team A. In the example, since SLM process 10 is launching 300 the collaboration service for team A, and identifying 302 the use data for team A for each collaboration service, SLM process 10 may pre-provision 304 the group chat (IM chat) collaboration service (although in this example the group chat (IM chat) would not actually be pre-provisioned as it was manually provisioned to launch the collaboration session), screen share collaboration service, whiteboard collaboration service, and video collaboration service, as each of those collaboration services have at least the threshold duration of time being used (by team A). Conversely, in the example, SLM process 10 would not pre-provision 304 eMeeting collaboration service or audio collaboration service, as those collaboration services have less than the threshold duration of time being used (by team A).

To avoid confusion, as described throughout, pre-provisioning 304 a collaboration service may exclude the manual provisioning of the collaboration service. For example, a collaboration service manually provisioned by a user (via their respective client electronic device and client application) in order to launch the collaboration session (such as the example above where the group chat (IM chat) collaboration service was used to initially launch 300 the collaboration session), or a collaboration service manually provisioned by the user during the collaboration session, may be excluded from the term "pre-provisioning".

As another example, further assume that SLM process 10 is launching 300 the collaboration service for team B. In the example, since SLM process 10 is launching 300 the collaboration service for team B, and identifying 302 the use data for team B for each collaboration service, SLM process 10 may pre-provision 304 only the audio collaboration service and the video collaboration service, as they are the only collaboration services that have at least the threshold duration of time being used (by team B). Conversely, in the example, SLM process 10 would not pre-provision 304 the group chat (IM chat) collaboration service, screen share collaboration service, or whiteboard collaboration service, as those collaboration services have less than the threshold duration of time being used (by team B).

As another example, further assume that SLM process 10 is launching 300 the collaboration service for team C. In the example, since SLM process 10 is launching 300 the collaboration service for team C, and identifying 302 the use data for team C for each collaboration service, SLM process 10 may not pre-provision 304 any of the collaboration services, as none of those have at least the threshold duration of time being used (by team C).

As such, in the example, SLM process 10 may negate the need to either manually provision each collaboration service on an as-needed basis during the collaboration session (which may take time and may disrupt the fluid nature of the collaboration session) or pre-provision all collaboration service (which may be an expensive process at least from the perspective of server side resources and may be wasteful as all of the provisioned collaboration services may not even be used).

In some implementations, SLM process 10 may determine 306 that an additional collaboration service is needed during the collaboration session and may update 308 the use data associated with the collaboration session. As noted above, the use data may include duration of use for one or more of at least one of the one or more collaboration services and an additional collaboration service provisioned during the collaboration session. For example, and referring at least to an example implementation of FIG. 7, an example table 700 is shown organizing use data (e.g., use data 17). In the example, further assume that at, e.g., 5 minutes into the collaboration session, user 48 (e.g., from Team A) wants to provision the eMeeting collaboration service (which was not already launched due to the eMeeting collaboration service having less than the threshold duration of time being used). Further in the example, user 48 may manually provision the eMeeting collaboration service, where SLM process 10 may determine 306 the need for the eMeeting collaboration service via the manual provisioning. Further assume that use of the manually provisioned eMeeting collaboration service occurs for, e.g., 25 minutes, and then the collaboration session ends. In the example, since the eMeeting collaboration service was used for an additional 25 minutes in the current collaboration session, SLM process 10 may update 308 the use data (e.g., in table 700), such that the duration of time the eMeeting collaboration service is now 50 minutes.

Continuing with the above example, assume that another collaboration session is launched 300 by user 48 (e.g., via SLM process 10) a few days later. In the example, since SLM process 10 is launching 300 the collaboration service for team A, and identifying 302 the (now updated) use data for team A for each collaboration service, SLM process 10 may pre-provision 304 the group chat (IM chat) collaboration service, eMeeting collaboration service, screen share collaboration service, whiteboard collaboration service, and video collaboration service, as each of those collaboration services (including the now updated use duration for the eMeeting collaboration service) have at least the threshold duration of time (e.g., 50 minutes) being used (by team A). Conversely, in the example, SLM process 10 would still not pre-provision 304 the audio collaboration service, as it still has less than the threshold duration of time being used (by team A).

In some implementations, SLM process 10 may determine 306 the need for the additional eMeeting collaboration service using contextual analysis. For instance, assume for example purposes only that during the collaboration session, user 48 types in the group chat window, "I need to show you this icon." In the example, SLM process 10 may use contextual analysis on those words to identify the words "icon" and/or "show," which may indicate that a visual collaboration service is needed. Thus, in the example, SLM process 10 may determine 306 the need for the additional eMeeting collaboration service (and/or the whiteboard collaboration service), as they may enable visual representations of the icon in the collaboration session. It will be appreciated that other examples of contextual analysis may be used to determine 306 the need for an additional collaboration service without departing from the scope of the disclosure.

In some implementations, the use data may include coefficient data associated with the collaboration session. In some implementations, the coefficient data may be derived using multi-factor regression analysis. For example, and referring again to table 600 in FIG. 6, SLM process 10 may analyze the use data using, e.g., binary regression to obtain a set of parameters. Using the estimates, SLM process 10 may create a fitted regression line. To solve, SLM process 10 may substitute values from the above table 600 (i.e., values from the same row). Assume for example purposes only that this results in coefficient data of p (or "iCollabUse" coefficient)=0.99999187.

In some implementations, via regression collaboration analysis, the collaboration services may be weighted on, e.g., a per team basis, a per individual basis, a per company basis, or any other basis. Based on a computed score for the coefficient data, a specific range of values may be defined, such as those shown in the table below. Thus, in the example, when launching 300 the collaboration session, SLM process 10 may identify 302 the coefficient data, and pre-provision 304 one or more collaboration services with the collaboration session based upon, at least in part, the coefficient data. For instance, in the example (based upon the collaboration services being weighted on a per team basis), since the coefficient is 0.99999187, it would fall between 0.9-1.0 in the table below, which may result in SLM process 10 pre-provisioning 304 the example collaboration services of IM Chat, eMeeting, Whiteboard, Screen Share, and A/V. In the example, if the coefficient were to fall between 0.16-0.2, SLM process 10 may pre-provision 304 the example collaboration services of IM Chat, and Whiteboard. Further in the example, if the coefficient were to fall between 0.1-0.15, SLM process 10 may pre-provision 304 the example collaboration service of IM Chat. It will be appreciated that various other score ranges for the coefficient data, as well as varying collaboration services per score range, may be used without departing from the scope of the disclosure. As such, the specific score ranges and associated collaboration services for those specific score ranges described throughout should be taken as example only and not to otherwise limit the scope of the disclosure.

| Score | Component/Collaboration Service |
| --- | --- |
| 0.1-0.15 | IM Chat |
| 0.16-0.2 | Chat and Whiteboard |
| ... | ... |
| ... | ... |
| ... | ... |
| 0.9-1.0 | IM Chat, eMeeting, Whiteboard, screen share, A/V |

It will be appreciated that other techniques and regression analysis may be used without departing from the scope of the disclosure. As such, the use of the specific multi-factor regression analysis described throughout should be taken as example only and not to otherwise limit the scope of the disclosure.

In some implementations, the coefficient data may be shared socially between collaborative groups (e.g., teams) to help provide optimal service usage patterns across a wider organization. For instance, assume for example purposes only that team A is a software designer team working at company X and team B is a software designer team working at company Y. In the example, rather than exclusively relying on the use data for team A (which according to table 600 may not result in the pre-provisioning 304 of the audio time collaboration service), SLM process 10 may share and gather use data from similar users or teams to determine that the pre-provisioning 304 of the audio time collaboration service should occur for team A.

As another example, in some implementations, SLM process 10 may gather an aggregated sentiment improvement metric when similar users and similar topics undergo a channel change. For example, if entry level UI designers usually prefer to initiate a whiteboard collaboration service session from an IM chat when the topic is about "icons," and the subsequent sentiment level shows an average improvement of, e.g., at least 10%, then that metric may be weighted by SLM process 10 in the overall coefficient data. Thus, in the example, the roles and context of the users may be monitored by SLM process 10 when using the service over a period of time, e.g., monitor for at least 6 months. The monitoring may allow that behavior to become more recognizable as patterns, e.g., in a sample set of 673 interactions, SLM process 10 may recognize that entry level UI designers usually prefer to initiate a whiteboard collaboration service session from an IM chat when the topic is about "icons." The sentiment of the outcome may also be taken into account by SLM process 10 monitoring the change, e.g., in the above-noted sample set of interactions, SLM process 10 may recognize that entry level UI designers are, e.g., 57% more satisfied after initiating a whiteboard session from an IM chat when the topic is about "icons." In some implementations, that sentiment may be derived by SLM process 10 by the sentiment contained in proximate content (e.g., a blog entry or forum entry), through voice/facial sentiment analysis, by having the user give explicit sentiment feedback, etc. Thus, in the example, SLM process 10 may pre-provision 304 the example collaboration services of the whiteboard collaboration service.

In some implementations, the coefficient data may be used for further analysis to rank new collaboration feature sets to determine efficacy/uptake, etc. For instance, any new collaboration services (or beneficial applications that may be used with a collaboration session) may be incorporated into the coefficient data (or other use data) to determine whether pre-provisioning is appropriate.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   launching, by a computing device, a collaboration session between a plurality of participants;

identifying use data associated with the collaboration session, wherein the use data includes one or more groups associated with the plurality of participants in the collaboration session;

pre-provisioning one or more collaboration services with the collaboration session based upon, at least in part, the use data, wherein the use data includes coefficient data associated with the collaboration session;

sharing the use data from at least one of one or more similar participants of the plurality of participants, and one or more similar groups of the one or more groups, to determine that the pre-provisioning of the one or more collaboration services should occur; and gathering an aggregated sentiment improvement metric when the at least one of one or more similar participants of the plurality of participants undergo a channel change, wherein the aggregated sentiment improvement metric is part of the coefficient data as a weighted factor, wherein the aggregated sentiment improvement metric is used with the coefficient data to pre-provision the collaboration services.

2. The computer-implemented method of claim 1 further comprising:
determining that an additional collaboration service is needed during the collaboration session; and
updating the use data associated with the collaboration session.

3. The computer-implemented method of claim 1 wherein the use data includes duration of use for one or more of at least one of the one or more collaboration services and an additional collaboration service provisioned during the collaboration session.

4. The computer-implemented method of claim 1 wherein the use data includes one or more of the plurality of participants in the collaboration session.

5. The computer-implemented method of claim 1 wherein the coefficient data is derived using multi-factor regression analysis.

6. The computer-implemented method of claim 1 wherein the coefficient data is used for further analysis to rank new collaboration feature sets to determine at least one of efficacy and uptake.

7. A computer program product residing on a non-transitory computer readable storage medium having a plurality of instructions stored thereon which, when executed across one or more processors, causes at least a portion of the one or more processors to perform operations comprising:

launching a collaboration session between a plurality of participants;

identifying use data associated with the collaboration session, wherein the use data includes one or more groups associated with the plurality of participants in the collaboration session;

pre-provisioning one or more collaboration services with the collaboration session based upon, at least in part, the use data, wherein the use data includes coefficient data associated with the collaboration session;

sharing the use data from at least one of one or more similar participants of the plurality of participants, and one or more similar groups of the one or more groups, to determine that the pre-provisioning of the one or more collaboration services should occur; and gathering an aggregated sentiment improvement metric when the at least one of one or more similar participants of the plurality of participants undergo a channel change, wherein the aggregated sentiment improvement metric is part of the coefficient data as a weighted factor, wherein the aggregated sentiment improvement metric is used with the coefficient data to pre-provision the collaboration services.

8. The computer program product of claim 7 further comprising:
determining that an additional collaboration service is needed during the collaboration session; and
updating the use data associated with the collaboration session.

9. The computer program product of claim 7 wherein the use data includes duration of use for one or more of at least one of the one or more collaboration services and an additional collaboration service provisioned during the collaboration session.

10. The computer program product of claim 7 wherein the use data includes one or more of the plurality of participants in the collaboration session.

11. The computer program product of claim 7 wherein the coefficient data is derived using multi-factor regression analysis.

12. The computer program product of claim 7 wherein the coefficient data is used for further analysis to rank new collaboration feature sets to determine at least one of efficacy and uptake.

13. A computing system including one or more processors and one or more memories configured to perform operations comprising:

launching a collaboration session between a plurality of participants;

identifying use data associated with the collaboration session, wherein the use data includes one or more groups associated with the plurality of participants in the collaboration session;

pre-provisioning one or more collaboration services with the collaboration session based upon, at least in part, the use data, wherein the use data includes coefficient data associated with the collaboration session;

sharing the use data from at least one of one or more similar participants of the plurality of participants, and one or more similar groups of the one or more groups, to determine that the pre-provisioning of the one or more collaboration services should occur; and gathering an aggregated sentiment improvement metric when the at least one of one or more similar participants of the plurality of participants undergo a channel change, wherein the aggregated sentiment improvement metric is part of the coefficient data as a weighted factor, wherein the aggregated sentiment improvement metric is used with the coefficient data to pre-provision the collaboration services.

14. The computing system of claim 13 further comprising:
determining that an additional collaboration service is needed during the collaboration session; and
updating the use data associated with the collaboration session.

15. The computing system of claim 13 wherein the use data includes duration of use for one or more of at least one of the one or more collaboration services and an additional collaboration service provisioned during the collaboration session.

16. The computing system of claim 13 wherein the use data includes one or more of the plurality of participants in the collaboration session.

17. The computing system of claim 13 wherein the coefficient data is derived using multi-factor regression analysis.

18. The computing system of claim 13 wherein the coefficient data is used for further analysis to rank new collaboration feature sets to determine at least one of efficacy and uptake.

\* \* \* \* \*